(12) United States Patent
Graewe et al.

(10) Patent No.: US 6,881,762 B2
(45) Date of Patent: Apr. 19, 2005

(54) PROCESS FOR RECYCLING POWDER COATING WASTE

(75) Inventors: Rene Graewe, Vilsbiburg (DE); Volker Paschmann, Essen (DE); Marek Nowak, Sprockhoevel (DE)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 10/255,805

(22) Filed: Sep. 26, 2002

(65) Prior Publication Data

US 2004/0072919 A1 Apr. 15, 2004

Related U.S. Application Data

(60) Provisional application No. 60/328,377, filed on Oct. 10, 2001.

(51) Int. Cl.[7] .......................... B29C 35/02; B29C 43/02
(52) U.S. Cl. ................ 521/40; 264/37.29; 264/460; 264/462; 264/114; 264/123; 264/911; 428/364; 428/402
(58) Field of Search ............... 264/460, 462, 264/114, 123, 37.29, 911; 521/40; 428/364, 402

(56) References Cited

U.S. PATENT DOCUMENTS

| | | | | |
|---|---|---|---|---|
| 6,162,861 A | * | 12/2000 | Kawamoto et al. | ......... 524/517 |
| 6,428,843 B1 | * | 8/2002 | Graewe et al. | ............. 427/180 |
| 6,433,030 B1 | * | 8/2002 | Blatter et al. | ................. 521/40 |
| 6,500,385 B1 | | 12/2002 | Blatter et al. | |
| 6,635,207 B1 | * | 10/2003 | Graewe | ...................... 264/117 |
| 6,793,163 B1 | * | 9/2004 | Kilner | ........................... 241/3 |

FOREIGN PATENT DOCUMENTS

| | | |
|---|---|---|
| DE | 4028587 A1 | 3/1992 |
| EP | 0 683 199 A2 * | 11/1995 |
| WO | WO 96/15891 * | 5/1996 |
| WO | WO 98/33848 * | 8/1998 |
| WO | WO99/23068 | 5/1999 |
| WO | WO 99/23176 * | 5/1999 |

* cited by examiner

Primary Examiner—Mary Lynn Thiesen
(74) Attorney, Agent, or Firm—Steven C. Benjamin

(57) ABSTRACT

A process for recycling of powder coating waste comprising the steps of (1) compressing powder coating waste to powder coating compacts having a volume of 0.5 mm$^3$ to 15 cm$^3$ by applying pressing forces; (2) placing the formed powder coating compacts into a vessel, rotating the vessel about a rotational axis inclined at an angle of 20 to 70 degrees relative to the horizontal and (3) heating the powder coating compacts while being moved in the rotating vessel until through-glassed powder coating bodies are formed.

12 Claims, 1 Drawing Sheet

PROCESS FOR RECYCLING POWDER COATING WASTE

FIELD OF THE INVENTION

The invention relates to the recycling of powder coating waste.

BACKGROUND OF THE INVENTION

The preparation of powder coatings is mostly carried out by extruding the powder coating ready formulated by dry mixing of all the required components (powder coating fresh material) in the form of a paste-like melt, cooling off of the melt, coarse comminution into so-called powder coating chips, fine milling (grinding) and subsequent sieving and classifying to desired grain fineness (powder coating classification). Powder coating material that is too coarse-grained (high grain) on sieving can again be fine-milled. Powder coating material that is too fine-grained (low grain) represents waste.

Powder coating waste also arises in the form of powder coating over-spray during the powder coating application.

Powder coating waste should if possible be recovered as powder coating to be employed for the original use, not only because of environmental considerations, but also because powder coatings are valuable materials.

Various methods that allow recycling of powder coating waste to be used for the original purpose are described in the patent literature.

DE-A40 28 567 describes the direct recycling of powder coating over-spray by addition of the over-spray to fresh material before or during extrusion, thus making the process complicated to handle.

In WO 96/15891 pressing of powder coating waste into friable tablets, which are then extruded together with fresh powder coating material, is described.

It is known from EP-A-0-683 199 to form a layer of powder coating waste, to expose the latter to heat, wherein the powder coating particles coalesce without degradation or cross-linking of the powder coating. IR-radiators can serve as the heat source. The coalesced powder coating particles are then again extruded alone or together with powder coating fresh material.

The processes known from DE-A-40 28 567, WO 96/15891 and EP-A-0-683 199 include a re-extrusion of the powder coating waste. This is linked to the danger of a too high thermal load.

WO 98/33848 describes the agglomeration of finely divided powder coating residues under the influence of pressure. The agglomerates can be returned to the powder coating preparation process.

WO 99/23068 and WO 99/23176 describe compacting of powder coating waste by applying pressure. The compacted powder coating waste can be ground together with fresh powder coating material that is to be ground.

The powder coating compacts prepared according to the processes known from WO 98/33848, WO 99/23068 and WO 99/23176 are only restrictively suitable for the preparation therefrom, by grinding, of powder coatings having the desired particle size distribution.

U.S. Pat. No. 6,162,861 describes the preparation of powder coating particles having a particle size suited for application by agglomeration of powder coating fine grain by heat and preferably with the use of auxiliary products promoting the agglomeration. The process is extremely difficult to control due to the strict requirements concerning the particle size distribution of the powder coating suited for application.

There is a requirement for providing an effective process for recycling powder coating waste. The powder coating material to be recycled should thereby be subjected as little as possible to heat. Any change in composition of the powder coating should be avoided. Likewise the addition for example of auxiliary products should be avoided.

SUMMARY OF THE INVENTION

The invention solves the problem in that powder coating waste is first compressed to powder coating compacts by applying pressure, which compacts are then converted to through-glassed powder coating bodies in a rotating vessel by applying low and uniform heat.

The invention therefore comprises a process for recycling of powder coating waste by, in a first step, compressing powder coating waste to powder coating compacts having a volume of 0.5 $mm^3$ to 15 $cm^3$ by applying pressing forces, and, in a second step, placing the formed powder coating compacts into a vessel; rotating the vessel about a rotational axis inclined at an angle of 20 to 70 degrees relative to the horizontal; and heating the powder coating compacts until through-glassed powder coating bodies are formed.

DETAILED DESCRIPTION OF THE EMBODIMENTS

Figure 1:
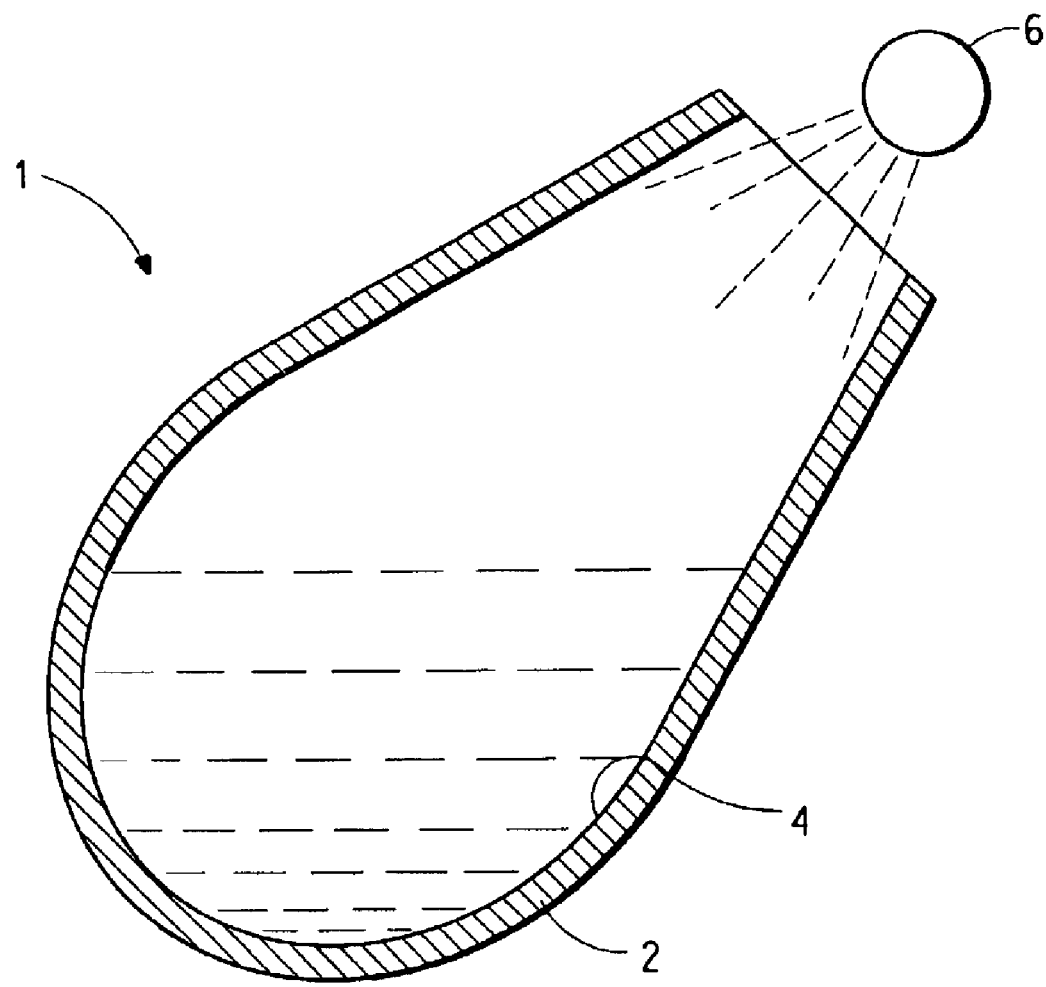
FIG. 1 shows a cross section of a vessel containing powder coating compacts heated by infra red or near infra red radiation.

In the process according to the invention, powder coating waste is recycled. Powder coating waste is coating powder having particle sizes or particle size distributions which are not suitable for powder coating application or which deviate from the theoretical value. The powder coating wastes have average particle sizes ($d_{50}$), in the range of 1 to 100 µm for example. The term ($d_{50}$) is the arithmetic mean value of the particle size distribution curve, 50% of the particles are below this value. Examples of powder coating waste are powder coating-over-spray having for example an average particle size ($d_{50}$) in the range of 10 to 100 µm, low grind according to the powder classification, for example, having an average particle size ($d_{50}$) in the range of 1 to 20 µm, faulty powder coating batches having particle size distributions which are not within the theoretical values or powder coatings which do not conform to the theoretical values of particle size distribution, for example, because of a faulty or over-long storage. The powder coating waste to be recycled in the process according to the invention can be thermoplastic or in particular duroplastic powder coating materials, which are for example curable by radiation or in particular thermally curable. The powder coating waste can be of pigmented powder coating or of powder clear coat.

Duroplastic resins are highly crosslinked synthetic resins that in the cured state do not melt on exposure to heat and cannot be dissolved in solvents. High heating of such plastic resins results in decomposition of the resin. Typical examples of duroplastic resins are epoxy resins and melamine formaldehyde resins. Duroplastic resins form useful powder coating compositions that typically are electrostatically applied.

Thermoplastic resins are synthetic resins of linear or branched macromolecules that have a reversible flow transition temperature range above the use temperature and are workable in the flow transition temperature range. Many plastics and coating resins are thermoplastics and can be used as a powder coating in fluidized beds.

The process according to the invention is suitable in particular for recycling high-quality powder coating waste, such as arise, for example, in the preparation or application of powder coatings used in the automotive industry, for example, automotive powder clear coats.

Powder coatings can be described according to the characteristic temperature behavior of each powder coating, i.e., several characteristic temperatures or discrete temperature ranges exist for each powder coating. Position and breadth of these temperatures or temperature ranges depend on the composition of each powder coating and can be determined by suitable physical methods. One commonly used determination method is, for example, DSC (differential scanning calorimetry). Powder coatings have a glass transition temperature, below which they are stored. The glass transition temperature of powder coatings is usually not a precisely defined glass transition temperature but, for example, a 20 to 40° C. wide glass transition temperature range. At temperatures above the glass transition temperature range, for example, powder coatings change into a rubber-elastic state, before the melting temperature range of the powder coatings is reached with a further rise of temperature. The breadth of the melting temperature range of powder coatings is, for example, from 20 to 150° C. and the lower limit of the melting temperature range is, for example, from 20 to 50° C. above the upper limit of the glass transition temperature range. The chemical cross-linking of a thermally curable powder coating starts to be noticeable within or above the melting temperature range. Particular importance is given, for example, therefore, to a rapid passage of the melted powder coating in the extruder in the preparation of thermally curable powder coatings. In the case of thermally curable powder coatings, the baking temperature chosen for curing is above the melting temperature range. The flow of a thermally curable powder coating can be controlled by the value of the baking temperature. On one hand, the viscosity of a powder coating melt falls with rising temperature, while on the other hand the speed of the chemical cross-linking of a thermally curable powder coating increases and therewith, the viscosity.

For example, using DSC at a heating rate of 10° C./min, a temperature behavior of current automotive powder clear coats can be determined, which can generally be characterized by 20 to 30° C. wide glass transition temperature ranges with a center in the range of 30 to 60° C., 40 to 50° C. wide ranges for the rubber-elastic state with a center in the range of 50 to 100° C. and 20 to 100° C. wide melting temperature ranges with a center in the range of 90 to 190° C.

In the process according to the invention, single-quality powder coating waste is preferably recycled. Single-quality powder coating wastes are characterized on the basis of an identical chemical composition by an identical temperature behavior in the sense described above. In the case of pigmented powder coating wastes, they are identically pigmented. In other words, it is preferred that the process not be carried out with mixtures of powder coating wastes of different composition.

The first step of the process according to the invention—the preparation of the powder coating compacts from powder coating waste by applying pressing forces—is well known to the person skilled in the art. The pressing step can for example be carried out in tools that are conventionally used to form pellets or tablets, such as tablet or roller presses. The tools, processes and process conditions disclosed in WO 96/15891, WO 98/33848, WO 99/23068 and WO 99/23176 are for example suitable for use in the first step of the process according to the invention for the preparation of the powder coating compacts.

The powder coating compacts can have any desired form; they may, for example, be rods, tablets, cylinders, ellipsoids, balls and the like. Preferable, the powder coating compacts are rotationally symmetrical forms, in particular balls or ellipsoids. The powder coating compacts are not very large, they have a volume of 0.5 $mm^3$ to 15 $cm^3$, preferably, of 0.5 $mm^3$ to 5 $cm^3$, corresponding to a size of, for example, 1 mm to 3 cm, preferably, 1 mm to 2 cm; that means their diameter in the direction of their largest extent ranges, for example, from 1 mm to 3 cm, preferably, from 1 mm to 2 cm.

The powder coating compacts can be comminuted again by applying relatively low forces. If they are used as starting materials for the production of powder coatings, powder coatings having a particle size distribution that does not correspond to the desired theoretical values are obtained upon fine milling the powder coating compacts.

In the second step of the process according to the invention, the powder coating compacts are through-glassed to powder coating bodies. The phrase "through-glassed" is a powder coating that has been heated above its glass transition temperature but below its melting temperature and is microscopically homogeneous. FIG. 1 shows a vessel assembly 1 of a rotatable vessel 2 containing powder coating compacts 4. The vessel 2 is illustrated as having a rotational axis inclined at an angle of about 45 degrees to the horizontal. The rotational axis inclined angle of the vessel can be from 20 to 70 degrees to the horizontal. The vessel is filled with the powder coating compacts, for example, at 10 to 50, preferably at 20 to 40% of its volume. The filling proportion based on the lower working capacity of the vessel, dictated by the process, is usually higher and is for example at 75 to 100% of the filling volume which is theoretically possible. The percentage indications each relate to the total volume occupied by the powder coating compacts and the cavities located there-between.

For the vessels, which can be rotated about a rotational axis inclined at an angle of 20 to 70 degrees to the horizontal, conventional equipment used in chemical or pharmaceutical technology may be used, such as, drum mixers, drum mixers having an onion-like shape, dish granulators, drum granulators or cone granulators. The vessels can be used in combination, which means transferring the powder coating material from one vessel into another during the course of the process according to the invention. The vessels or interior vessel walls are preferably of a material, which allows easy cleaning and does not undergo any change in the range of temperatures in the process according to the invention. Preferred are vessels of special steel with a smooth interior surface. The vessels can be operated in an open or closed state.

After filling with powder coating compacts, the vessel is rotated about a rotational axis inclined at an angle of 20 to 70, preferably 30 to 60 degrees to the horizontal. The rotational speed chosen is sufficiently low that a harmful influence on the powder coating compacts with respect to the desired result is avoided. A distribution of the powder coating compacts on the entire vessel wall brought about by too high centrifugal forces or a high-rupturing of the powder coating compacts in particular should be avoided. The rotational speed as defined by the circumferential speed is for example 20 to 75 m/min.

While the powder coating compacts are uniformly moved by the rotation of the vessel, they are exposed to heat until through-glassed powder coating bodies have formed. It is advantageous that, due to the constant circulation, the heat load of the powder coating material is extremely uniform. FIG. 1 shows a heat source 6, such as infra red or near infra red radiation, being used to heat the powder coating compacts.

In the formation of the through-glassed powder coating bodies, the heat action on the powder coating compacts in motion is carried out in such a way that a temperature (theoretical temperature) is set which is within the glass transition temperature range to below the melting temperature range, preferably above the glass transition temperature range. Preferably, a uniform temperature with a temperature deviation of for example not more than +/−5° C. is set within the powder coating material. The melting temperature range shall in no case be reached, likewise avoiding a worth mentioning chemical reaction of the cross-linking system in the case of thermally curable powder coating material. The temperature of the powder coating material in motion can be determined directly within the powder coating material or without contact, for example, pyrometrically, on its surface. The heat supply can be accordingly controlled.

The duration of the heat action described is chosen such that through-glassed powder coating bodies are formed from the powder coating compacts. The duration depends, among other things, on the batch size, the process can for example last 5 to 40 minutes, preferably 15 to 30 minutes, after reaching the theoretical temperature in the powder coating material with batch sizes of 50 to 100 kg powder coating compacts. The completeness of the through-glassing of the powder coating compacts to powder coating bodies and thus the end of the process can easily be tested by comparing the breaking behavior of the powder coating bodies with that of powder coating chips in the powder coating milling process. In fact, the breaking behavior of the through-glassed powder coating bodies corresponds to that of powder coating chips.

The heat action on the powder coating compacts can be carried out by different heat supply methods, for example, by supplying hot air corresponding to a desired temperature on the surface and/or below the surface of the powder coating material in motion and/or via a correspondingly tempered vessel interior wall. Hot air can be supplied expediently below the surface of the powder coating material in motion, for example, via a tube having a cooled wall and several bores.

It is preferred to supply the heat in the form of heat radiation, in addition to the heat supply methods mentioned above or in particular instead of these. The surface of the powder coating material in motion can be irradiated by heat radiation. Position and distance of the heat radiation source are expediently chosen so that the greatest part of the surface of the powder coating material in motion is irradiated; the heat radiation source can, for example, be positioned at 30 to 100 cm above the surface of the powder coating material. The heat radiation source can be operated within or outside of the vessel. Heat radiation sources that are operated inside the vessel are preferably rinsed with an air cushion in order to avoid their contamination. Vessels operated in the open state or vessels operated in the closed state with a lid that transmits heat radiation are used in the case of heat radiation sources that are operated outside of the rotating vessel. Conventional sources for infrared—or near infrared-radiation may be used as heat radiation sources, wherein the temperature in the powder coating material in motion is conveniently controlled via power consumption and/or suited clocking of the heat radiation sources.

After through-glassed powder coating bodies are formed, they are cooled off below the glass transition temperature range, preferably while the vessel is still rotating. The cooling-off can take place after an interruption of the heat supply by temperature equalization with the surroundings or it can be assisted by heat abstraction, for example, by supplying dry cold air onto the surface and/or below the surface of the through-glassed powder coating bodies in motion, by adding volatile cooling agents, such as, dry ice or liquefied inert gases and/or via a correspondingly cooled vessel interior wall. Care should be taken that no humidity condensates in the powder coating bodies if extra cooling is used.

The process according to the invention, herein described as a process operated in batch quantities, can also be carried out continuously. In a continuous process, it may be expedient to make use of a cylindrical rotary tube with a heating facility. The cylindrical rotary tube may be used instead of a vessel or in addition to a vessel, for example, by carrying out part of the heat treatment of the powder coating compacts in a vessel and transferring the powder coating material from the vessel into the cylindrical rotary tube during the course of the process and finishing the heat treatment there.

The invention also relates to the through-glassed powder coating bodies obtainable by the process according to the invention. The through-glassed powder coating bodies must not be confused with powder coating compacts consisting of powder coating particles pressed or optionally, sintered together. Such prior art powder coating compacts are not homogeneous, at least from a microscopical point of view. The powder coating compacts rather consist of individual powder coating particles that are more or less tightly joined together. In other words, the individual powder coating compact contains cavities and channels filled with air between the powder coating particles joined together and/or the powder coating particles themselves have not been exposed to enough or sufficiently uniform heat during the preparation of the powder coating compact. In contrast to the powder coating compacts the powder coating bodies formed in the process according to the invention are through-glassed and therefore homogeneous from a microscopical point of view.

While the powder coating compacts can be comminuted without a large expenditure of force, the through-glassed powder coating bodies are distinctive by their breaking behavior, which corresponds to the breaking behavior of powder coating chips. The application of forces such as are needed for the milling of powder coating chips is required for their comminution. This breaking behavior equivalent to the breaking behavior of powder coating chips represents the key factor for making the through-glassed powder coating bodies particularly suitable for the preparation of powder coatings.

Powder coatings having particle size distributions suitable for application within the theoretical value range can be prepared from the through-glassed powder coating bodies. The through-glassed powder coating bodies may be supplied alone or together with powder coating chips directly for fine milling. The conventional processing steps before fine milling in the powder coating production process can be avoided. The powder coatings prepared from the through-glassed powder coating bodies correspond to powder coatings which have been prepared exclusively with fresh material both with respect to their application technology behavior and to the technological properties of coatings prepared therewith. Also, the through glassed powder coating bodies can be used for the production of aqueous powder coating dispersions or slurries. The recycled powder coatings can therefore be used for their original purpose and their use is not being limited to lower value purposes.

In the recycling process according to the invention, the powder coating waste is exposed to only reduced and uniform heat under gentle process conditions.

A change in composition of the recycling material with respect to the fresh powder coating does not occur. The powder coating bodies are products which are easy to handle with respect to their further processing and can be used to prepare a powder coating that is of equal in quality to the corresponding original powder coating.

EXAMPLE 45 kg automotive powder clear coating-low grind according to the powder coating classification (with a glass transition temperature range of 26 to 52° C. and a melting temperature range of 90 to 120° C. determined with DSC at a heating rate of 10° C./min) having an average particle size ($d_{50}$) of 10 µm were pressed to ellipsoid powder clear coat compacts having a size of 0.5 cm×2 cm by making use of a roller press.

The ellipsoid powder clear coat compacts were filled into a drum-mixer having an onion-like shape and made of special steel with a volume of 500 l. The mixer was rotated with a circumferential speed of 45 m/min about its rotational axis inclined at an angle of 45 degrees to the horizontal. The surface of the powder clear coating material in motion was irradiated through the aperture of the mixer with an infrared radiator fixed above at a distance of 50 cm (maximum power consumption 6 kW). After reaching a temperature of 75° C. in the powder clear coating material, the material was kept at this temperature for an additional 25 minutes. Thereafter, the infrared radiator was switched off and the batch was cooled for 30 min while the mixer was still rotating. Through-glassed, ellipsoid powder clear coating bodies were obtained, which could be further processed into a powder clear coating which after milling and classifying will not be distinguishable in its properties from the original automotive powder clear coating.

What is claimed is:

1. A process for recycling of powder coating waste comprising the steps of (1) compressing powder coating waste to powder coating compacts having a volume of 0.5 $mm^3$ to 15 $cm^3$ by applying pressing forces; (2) placing the formed powder coating compacts into a vessel, rotating the vessel about a rotational axis inclined at an angle of 20 to 70 degrees relative to the horizontal and (3) heating the powder coating compacts while being moved in the rotating vessel until through-glassed powder coating bodies are formed.

2. The process of claim 1, wherein the powder coating compacts have a volume of 0.5 $mm^3$ to 5 $cm^3$.

3. The process of claim 1, wherein the powder coating compacts have a form selected from the group consisting of rods, tablets, cylinders, ellipsoids and balls.

4. The process of claim 1, wherein the powder coating waste is selected from the group consisting of thermoplastic powder coating and duroplastic powder coating material.

5. The process of claim 1, wherein the powder coating waste is selected from the group consisting of pigmented powder coating and powder clear coat.

6. The process of claim 1, wherein the powder coating waste is single-quality powder coating waste.

7. The process of claim 1, wherein the vessel is selected from the group consisting of a drum mixer, a drum mixer having an onion-like shape, a dish granulator, a drum granulator and a cone granulator.

8. The process of claim 1, wherein the powder coating compacts are heated to a temperature from within the glass transition temperature range to a temperature below the melting temperature range of the powder coating material.

9. The process of claim 1, wherein the powder coating compacts are heated to a temperature above the glass transition temperature range but below the melting temperature range of the powder coating material.

10. The process of claim 1, wherein the heat is applied to the powder coating material by means of a heating source selected from the group consisting of dry hot air, a heated interior wall of the vessel, heat radiation, and combinations thereof.

11. The process of claim 1, further comprising the step of cooling the powder coating bodies to a temperature below the glass transition temperature range.

12. Powder coating bodies of recycled powder coating waste prepared by the process of claim 1.

* * * * *